3,320,123
INSECTICIDES OF PHOSPHORUS ESTERS OF HY-
DROXY-1,2,3-BENZOTHIADIAZOLES
Johannes Th. Hackmann, Enschede, Netherlands, and
Peter Kirby, Maidstone, Kent, England, assignors to
Shell Oil Company, New York, N.Y., a corporation of
Delaware
No Drawing. Original application Dec. 6, 1965, Ser. No.
512,019, now Patent No. 3,275,647, dated Sept. 27,
1966. Divided and this application May 27, 1966, Ser.
No. 553,304
Claims priority, application Great Britain, Dec. 8, 1964,
49,894/64
10 Claims. (Cl. 167—33)

This is a division of application Ser. No. 512,019, filed Dec. 6, 1965, now U.S. Patent 3,275,647.

This invention relates to insecticidal compositions containing certain organophosphorus compounds, and to the use of said compounds and compositions in combatting insect pests, and in protecting ornamental and crop plants from attack by insects.

The insecticides of the invention can be represented by the general formula:

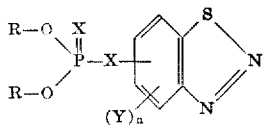

wherein each R represents alkyl of from 1 to 4 carbon atoms, each X represents oxygen or sulfur, $n$ is zero or one, and Y is middle halogen—that is, chlorine or bromine.

In this specification, these compounds will be named as substituted 1,2,3-benzothiadiazoles, in accordance with the conventional numbering system:

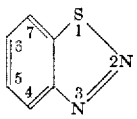

The organophosphorus moiety can be bonded at any of the carbon atoms at the 4-, 5-, 6- and 7-positions in the ring, and the halogen substituent can be bonded at any of the other three carbon atoms. In the unsubstituted compounds ($n=0$), it may be preferable from the standpoint of over-all insecticidal activity that the organophosphorus moiety be bonded to the carbon atom at the 6-position in the ring, since species of the compounds of the invention having this configuration appear to have the highest level of insecticidal activity, generally. The general level of insecticidal activity appears to diminish with configurations in which the organophosphorus moeity is bonded to the carbon atoms at the 5- and 7-positions in the ring, respectively. In the substituted compounds ($n=1$), also from the standpoint of general insecticidal activity, it is to be preferred that the halogen, Y, not be in vicinal configuration with respect to the organophosphorus moiety, the preferred configuration being that in which the organophosphorus moiety in 7- (4-) position; Y being in 4- (7-) position, since this apparently confers the highest general insecticidal activity.

Because they are easier to manufacture and cost less, the unsubstituted compounds ($n=0$) may be preferred.

The general character of these compounds is illustrated by the thirteen species whose preparation and testing as insecticides is described in the working examples. In addition, the following species further illustrate the general class:

6-chloro-7-(dimethoxyphosphinothioyloxy)-1,2,3-
benzothiadiazole;
5-chloro-6-(dimethoxyphosphinothioyloxy)-1,2,3-
benzothiadiazole;
4-(dimethoxyphosphinothioyloxy)-1,2,3-benzothiadiazole;
4-(dimethoxyphosphinyloxy)-1,2,3-benzothiadiazole;
5-chloro-4-(dimethoxyphosphinothioyloxy)-1,2,3-
benzothiadiazole;
5-bromo-4-(dimethoxyphosphinyloxy)-1,2,3-
benzothiadiazole;
7-chloro-4-(dimethoxyphosphinothioyloxy)-1,2,3-
benzothiadiazole;
4-bromo-5-(dimethoxyphosphinothioyloxy)-1,2,3-
benzothiadiazole;
6-chloro-5-(dimethoxyphosphinyloxy)1,2,3-benzo-
thiadiazole;
7-chloro-4-(dimethoxyphosphinothioyloxy)-1,2,3-
benzothiadiazole;
6-chloro-4-(dimethoxyphosphinothioyloxy)-1,2,3-
benzothiadiazole;
7-chloro-5-(dimethoxyphosphinothioyloxy)-1,2,3-
benzothiadiazole.

The manner in which such compounds can be prepared is described in application Ser. No. 512,019, of which the present application is a division.

These compounds have a broad spectrum of insecticidal activity comparable with the widely used insecticide parathion. Thus, the compounds effectively kill such different types of insects as flies, mosquito larvae, beetles, moth larvae, aphids and mites. Coupled with this broad spectrum of insecticidal activity some of the compounds, unlike parathion, posses a surprisingly low mammalian toxicity; for example 6-(dimethoxyphosphinothioyloxy)-1,2,3-benzothiadiazole has an acute oral toxicity ($LD_{50}$) to mice of greater than 400 mg./kg. body weight.

The use of these compounds as insecticides is illustrated by the following insecticidal tests which give an indication of the "kill" obtained with a 0.1% solution of active ingredient in an acetone/emulsifier mixture. The insect species used were houseflies, *Aedes aegypti* mosquito larvae, mustard beetle, diamondback moth larvae, Pea aphids, and two-spotted spider mite abbreviated H.F., A.a., M.b., D.b.m., P.a., and T.s.m. respectively. In the table below, A indicates total kill, B partial kill and C no kill of the test insects.

The compounds tested were:

I—5-(dimethoxyphosphinothioyloxy)1,2,3-benzo-
thiadiazole
II—5-(diethoxyphosphinyloxy)-1,2,3-benzothiadiazole
III—5-(diethoxyphosphinothioyloxy)-1,2,3-benzothia-
diazole
IV—6-(dimethoxyphosphinothioyloxy)-1,2,3-
benzothiadiazole
V—6-(diethoxyphosphinyloxy)-1,2,3-benzothiadiazole
VI—6-(diethoxyphosphinothioyloxy)-1,2,3-
benzothiadiazole
VII—6-(methoxyethoxyphosphinothioyloxy)-1,2,3-
benzothiadiazole
VIII—7-(dimethoxyphosphinothioyloxy)-1,2,3-
benzothiadiazole
IX—7-(diethoxyphosphinyloxy)-1,2,3-benzothiadiazole
X—7-chloro-6-(dimethoxyphosphinothioyloxy)-1,2,3-
benzothiadiazole
XI—7-chloro-6-(diethoxyphosphinyloxy)-1,2,3-
benzothiadiazole
XII—7-bromo-6-(dimethoxyphosphinothioyloxy)-1,2,3-
benzothiadiazole
XIII—4-chloro-7-(dimethylphosphinothioyloxy)-1,2,
3-benzothiadiazole

| Compound | Kill of Insects | | | | | |
|---|---|---|---|---|---|---|
|  | H.f. | A.a. | M.b. | D.b.m. | P.a. | T.s.m. |
| I | A | A | A | A | A | A |
| II | A | B | A | A | A | A |
| III | A | A | A | A | A | A |
| IV | A | A | A | A | A | A |
| V | A | A | A | A | A | A |
| VI | A | A | A | A | A | A |
| VII | A | A | A | A | A | A |
| VIII | A | C | C | A | A | B |
| IX | A | C | C | A | A | A |
| X | C | A | A | A | A | B |
| XI | A | C | A | B | A | A |
| XII | B | A | B | A | A | B |
| XIII | A | A | A | A | A | A |

According to another feature of the invention, the insecticides of this invention may be formulated as compositions comprising one or more of said compounds and a carrier, a surface active agent, or both a carrier and a surface active agent. The carrier may be a solid or liquid and may be of natural or synthetic origin. The carrier may be a fertilizer. The surface active agent may be a wetting, emulsifying or dispersing agent.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon, resins such as, for example, polyvinyl chloride and polymers and copolymers of styrene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene, and isodurene, coal tar fractions, straight-run petroleum distillates, thermally or catalytically cracked hydrocarbon oils, platformates, refined gas oil, light lubricating oil fractions, refined kerosine, animal and vegetable oils, and organic solvents such as, for example, methanol, ethanol, isopropanol, n-butanol, amyl alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecule, alkylaryl polyoxyethylene glycol ethers, sorbitan esters of fatty acids containing at least 10 carbon atoms in the molecule, alkylamide sulfonates, and condensation products of ethylene oxide with fatty acid esters, for example the oleic acid ester of anhydrosorbitol. Although both anion- and cation-active surface active agents may be used, the non-ionic surface active agents are preferred.

The compositions of the invention may be concentrates, suitable for storage or transport and containing, for example, from 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing an added emulsifying agent. Aqueous emulsions or dispersions containing an organophosphorus compound as specified above are also within the scope of the invention.

The compositions of the invention may contain in addition to the pesticidal organophosphorus compounds specified above other ingredients, for example, stickers, wetting agents, synergists, stabilizers, or biologically active substances such as other insecticides, fungicides or herbicides. Thus, insecticides such as, for example, 1,1,1 - trichloro - 2,2 - bis(p-chlorophenyl)ethane; endrin; dieldrin; aldrin; O,O - dimethyl-O-(2,2,-dichlorovinyl) phosphate; O,O-dimethyl-O-(1,2 - dibromo - 2,2 - dichloroethyl)phosphate; O,O - dimethyl - O - [1-methyl-2(1 - phenylcarbethoxy)-vinyl] phosphate; O,O-dimethyl-O - [2-N,N-dimethylcarbamoyl - 1 - methylvinyl] phosphate; rotenone and pyrethrum may be incorporated in the compositions of the invention.

The present invention also relates to a method of combatting insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

We claim as our invention:

1. A method for controlling insects comprising subjecting insects to the action of a phosphorus ester of the formula:

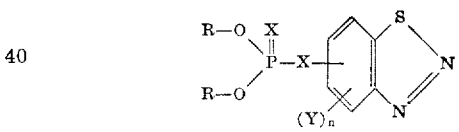

wherein each R represents alkyl of from 1 to 4 carbon atoms, $n$ is zero or one, Y represents middle halogen and each X represents oxygen or sulfur.

2. A method according to claim 1 wherein the ester is 5-(dimethoxy-phosphinothioyloxy)-1,2,3-benzothiadiazole.

3. A method according to claim 1 wherein the ester is 5-(diethoxyphosphinyloxy)-1,2,3-benzothiadiazole.

4. A method according to claim 1 wherein the ester is 5-(diethoxyphosphinothioyloxy)-1,2,3-benzothiadiazole.

5. A method according to claim 1 wherein the ester is 6-(dimethoxyphosphinothioyloxy)-1,2,3-benzothiadiazole.

6. A method according to claim 1 wherein the ester is 6-(diethoxyphosphinyloxy)-1,2,3-benzothiadiazole.

7. A method according to claim 1 wherein the ester is 6-(diethoxyphosphinothioyloxy)-1,2,3-benzothiadiazole.

8. A method according to claim 1 wherein the ester is 4 - chloro - 7 - (dimethoxyphosphinothioyloxy) - 1,2,3-benzothiadiazole.

9. An insecticidal formulation comprising a phosphorus ester defined in claim 1 together with an adjuvant therefor, the ester content amounting to from 0.00001 to 95 percent of the weight of the formulation.

10. A formulation according to claim 9 wherein the ester is 6-(dimethoxyphosphinothioyloxy) - 1,2,3-benzothiadiazole.

No references cited.

LEWIS GOTTS, *Primary Examiner.*

S. K. ROSE, *Assistant Examiner.*